US012009121B2

(12) United States Patent
Flory et al.

(10) Patent No.: US 12,009,121 B2
(45) Date of Patent: Jun. 11, 2024

(54) COATED CONDUCTOR

(71) Applicant: Dow Global Technologies LLC, Midland, MI (US)

(72) Inventors: Anny L. Flory, Ewing, NJ (US); Karl M. Seven, Collegeville, PA (US); Mohamed Esseghir, Collegeville, PA (US); Chester J. Kmiec, Collegeville, PA (US); Rajen M. Patel, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 514 days.

(21) Appl. No.: 17/255,026

(22) PCT Filed: Jun. 27, 2019

(86) PCT No.: PCT/US2019/039580
§ 371 (c)(1),
(2) Date: Dec. 22, 2020

(87) PCT Pub. No.: WO2020/023178
PCT Pub. Date: Jan. 30, 2020

(65) Prior Publication Data
US 2023/0144837 A1 May 11, 2023

Related U.S. Application Data

(60) Provisional application No. 62/703,107, filed on Jul. 25, 2018.

(51) Int. Cl.
*H01B 3/44* (2006.01)

(52) U.S. Cl.
CPC .................. *H01B 3/441* (2013.01)

(58) Field of Classification Search
CPC ....................................... H01B 3/441
USPC ........................................... 428/379
See application file for complete search history.

(56) References Cited

U.S. PATENT DOCUMENTS

| | | | |
|---|---|---|---|
| 5,677,383 A | 10/1997 | Chum et al. | |
| 5,783,638 A | 7/1998 | Lai et al. | |
| 6,111,023 A | 8/2000 | Chum et al. | |
| 6,984,695 B2 | 1/2006 | Brown et al. | |
| 2010/0084158 A1 | 4/2010 | Gau et al. | |
| 2014/0038486 A1* | 2/2014 | Crowther | B01J 31/1616 526/170 |
| 2015/0357081 A1 | 12/2015 | Mizuno et al. | |
| 2016/0002450 A1 | 1/2016 | Chiba et al. | |
| 2016/0009908 A1 | 1/2016 | Chiba et al. | |
| 2018/0010008 A1 | 1/2018 | Lee | |

(Continued)

FOREIGN PATENT DOCUMENTS

| | | |
|---|---|---|
| CN | 103804798 A1 | 5/2014 |
| JP | 2002015626 A * | 1/2002 |

(Continued)

*Primary Examiner* — Lynda Salvatore
(74) *Attorney, Agent, or Firm* — Boyle Fredrickson, S.C.

(57) ABSTRACT

The present disclosure provides a coated conductor. The coated conductor includes a conductor and an outermost coating on the conductor. The coating includes (A) an ethylene-based polymer having an I21/I2 ratio from 20 to 50; and (B) a propylene/ethylene copolymer having a Mw/Mn from 2.0 to 3.5. The coating has a surface roughness from 20 μ-inch to 100 μ-inch.

20 Claims, 1 Drawing Sheet

(56) References Cited

U.S. PATENT DOCUMENTS

2019/0048177 A1  2/2019  Esseghir et al.
2019/0177567 A1  6/2019  Lee

FOREIGN PATENT DOCUMENTS

| JP | 2004-535478 A | | 11/2004 | |
|---|---|---|---|---|
| JP | 2005-534802 A | | 11/2005 | |
| JP | 2016204673 A | * | 12/2016 | ............. C08F 10/00 |
| WO | WO-02085954 A2 | * | 10/2002 | .......... C08L 23/0815 |
| WO | 2009/067337 A1 | | 5/2009 | |
| WO | 2018/118741 A2 | | 6/2018 | |

* cited by examiner

COATED CONDUCTOR

BACKGROUND

Cables, such as power cables or communication cables, are a type of conductor which include an inner conducting element such as a metal wire or a glass fiber, and one or more outer layers for shielding and protecting purposes. The outermost coating, or outermost layer, of the cable is a protective layer typically referred to as the outer sheath or outer jacket.

Known is ethylene-based polymer for the manufacture of cable jackets. Ethylene-based polymer for use in cable jackets should possess good processability, such as good extrusion properties at broad processing temperature ranges. Furthermore, such ethylene-based cable jackets should generally possess good mechanical properties. Cable jackets made from ethylene-based solution resins (SR resins) with an I21/I2 ratio less than 50 are generally known to exhibit sufficient mechanical properties for cable applications. However, cable jackets made from ethylene-based solution resins (SR resins) with an I21/I2 ratio less than 50 do not process well on extrusion equipment resulting in unacceptable surface roughness at typical extrusion line speed when compared to equivalent compounds based on broader molecular weight distribution (MWD) gas phase polymerization resins (GP resins).

The art recognizes the need to diversify and broaden the types of polymeric resins available for use in cable jacket applications while maintaining suitable processability and suitable mechanical and performance properties.

SUMMARY

The present disclosure is directed to a coated conductor. The coated conductor includes a conductor and an outermost coating on the conductor. The coating includes (A) an ethylene-based polymer having an I21/I2 ratio from 20 to 50; and (B) a propylene/ethylene copolymer having a Mw/Mn from 2.0 to 3.5. The coating has a surface roughness from 20µ-inch to 100 µ-inch.

DEFINITIONS

Figure 1:
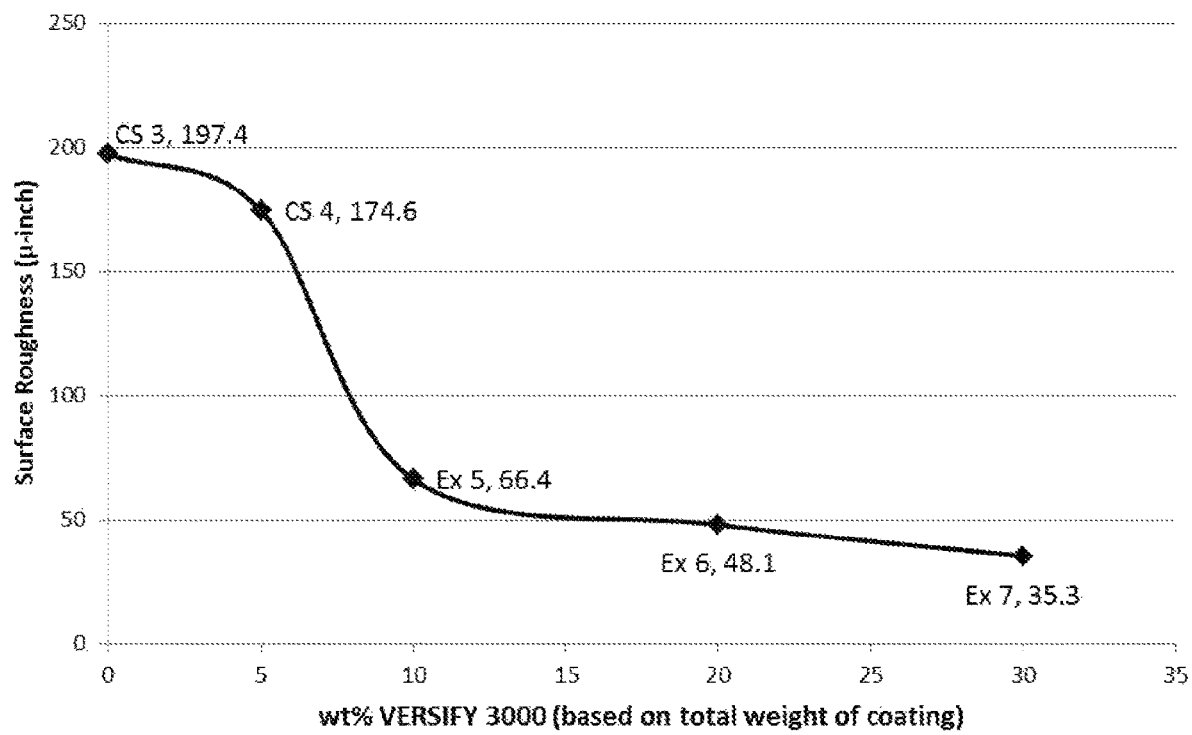
FIG. 1 is a graph showing the impact on surface roughness of the amount of propylene/ethylene copolymer in coating samples containing LLDPE.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

A "conductor" is one or more wire(s), or one or more fiber(s), for conducting heat, light, and/or electricity. The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications.

An "ethylene-based polymer" is a polymer that contains more than 50 weight percent polymerized ethylene monomer (based on the total weight of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Non-limiting examples of ethylene-based polymer (polyethylene) include low density polyethylene (LDPE) and linear polyethylene. Non-limiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$ α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetra polymers, etc.

A "jacket" is a coating on the conductor.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer or at least one $C_4$-$C_8$ α-olefin comonomer, or at least one $C_6$-$C_8$ α-olefin comonomer. LLDPE is characterized by little, if any, long chain branching, in contrast to conventional LDPE. LLDPE has a density from 0.916 g/cc to 0.925 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Low density polyethylene" (or "LDPE") is an ethylene homopolymer, or an ethylene/α-olefin copolymer comprising at least one $C_3$-$C_{10}$ α-olefin, or a $C_3$-$C_4$α-olefin, that has a density from 0.915 g/cc to 0.925 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

Medium density polyethylene (or "MDPE") is an ethylene homopolymer, or an ethylene/α-olefin copolymer comprising at least one $C_3$-$C_{10}$ α-olefin, or a $C_3$-$C_4$α-olefin, that has a density from 0.926 g/cc to 0.940 g/cc.

"Multi-component ethylene-based copolymer" (or "EPE") comprises units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer, such as described in patent references U.S. Pat. Nos. 6,111,023; 5,677,383; and 6,984,695. EPE resins have a density from 0.905 g/cc, or 0.912 g/cc, or 0.920 g/cc to 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. A nonlimiting example of a propylene-based polymer (polypropylene) is a propylene/α-olefin copolymer with at least one $C_2$ or $C_4$-$C_{10}$ α-olefin comonomer.

"Single-site catalyzed linear low density polyethylenes" (or "m-LLDPE") are linear ethylene/α-olefin copolymers containing homogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. m-LLDPE has density from 0.913 g/cc, or 0.918 g/cc, or 0.920 g/cc to 0.925 g/cc, or 0.940 g/cc. Nonlimiting examples of m-LLDPE include EXCEED™ metallocene PE (available from ExxonMobil Chemical), LUFLEXEN™ m-LLDPE (available from LyondellBasell), and ELTEX™ PF m-LLDPE (available from Ineos Olefins & Polymers).

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ULDPE resins (available from The Dow Chemical Company) and FLEXOMER™ VLDPE resins (available from The Dow Chemical Company).

TEST METHODS

Density is measured in accordance with ASTM D792 with values reported in grams per cubic centimeter (g/cc or g/cm³).

Melt flow rate (MFR) is measured at 230° C. under a load of 2.16 kg according to ASTM D1238, and is reported in grams eluted per 10 minutes (g/10 min).

Melt index (I2) is measured at 190° C. under a load of 2.16 kg according to ASTM D1238, and is reported in grams eluted per 10 minutes (g/10 min).

Melt index (I10) is measured at 190° C. under a load of 10.0 kg according to ASTM D1238, and is reported in grams eluted per 10 minutes (g/10 min).

Melt index (I21) is measured at 190° C. under a load of 21.0 kg according to ASTM D1238, and is reported in grams eluted per 10 minutes (g/10 min).

Melt index I21/I2 or "I21/I2 ratio." The I21/I2 ratio is an indirect measure of the viscosity ratio at high shear rates and low shear rates and is indicative of shear thinning behavior which is related to both molecular weight distribution (MWD) as well as the presence of long chain branching, each of which significantly affect processability. In general, polyethylene containing long chain branching possesses high melt strength and exhibits low viscosity under high shear rate conditions, permitting high processing rates compared to polyethylene with little, or no, long chain branching.

Relaxation Spectrum Index (RSI) and Normalized Relaxation Spectrum Index (nRSI). The RSI and nRSI are rheological indicators of molecular weight distribution. RSI is determined by first subjecting the polymer or composition to a shear deformation and measuring its response to the deformation using a rheometer. Dynamic oscillatory shear testing is conducted at 190° C. with 0.25% strain using 25 mm plates at from 0.01 to 100 rad/sec. As is known in the art, based on the response of the polymer and the mechanics and geometry of the rheometer used, the relaxation modulus G(t) or the dynamic moduli G'(ω) and G"(ω) may be determined as functions of time, t, or frequency, ω, respectively (see J. M. Dealy & K. F. Wissbrun, *Melt Rheology and Its Role in Plastics Processing* 269-297 (1990)). The mathematical connection between the dynamic and storage moduli is a Fourier transform integral relation, but one set of data may also be calculated from the other using the well-known relaxation spectrum (see S. H. Wasserman, 39 *J. Rheology* 601-625 (1995)). Using a classical mechanical model, a discrete relaxation spectrum consisting of a series of relaxations or "modes," each with a characteristic intensity or "weight" and relaxation time, may be defined. Using such a spectrum, the moduli are re-expressed as:

$$G'(\omega) = \sum_{i=1}^{N} g_i \frac{(\omega \lambda_i)^2}{1+(\omega \lambda_i)^2} \quad \text{Equation (A)}$$

$$G''(\omega) = \sum_{i=1}^{N} g_i \frac{\omega \lambda_i}{1+(\omega \lambda_i)^2} \quad \text{Equation (B)}$$

$$G(t) = \sum_{i=1}^{N} g_i \exp(-t/\lambda_i) \quad \text{Equation (C)}$$

where N is the number of modes and $g_i$ and $\times_1$ are the weight and time for each of the modes (see J. D. Ferry, *Viscoelastic Properties of Polymers* 224-263 (1980)). A relaxation spectrum may be defined for the polymer or composition using software such as IRIS® rheological software, which is commercially available from IRIS Development. Once the distribution of modes in the relaxation spectrum is calculated, the first and second moments of the distribution, which are analogous to $M_n$ and $M_w$, the first and second moments of the molecular weight distribution, are calculated as follows:

$$g_I = \sum_{i=1}^{N} / \sum_{i=1}^{N} g_i / \lambda_i \quad \text{Equation (D)}$$

$$g_{II} = \sum_{i=1}^{N} g_i \lambda_i / \sum_{i=1}^{N} g_i \quad \text{(E)}$$

$$RSI = g_{II}/g_I \quad \text{Equation (F)}$$

nRSI is calculated as follows:

$$nRSI = RSI \times MI^{0.5} \quad \text{Equation (G)},$$

where MI is melt index (I2). Because RSI is sensitive to such parameters as a polymer's molecular weight distribution, molecular weight, and long chain branching, it is a sensitive and reliable indicator of the stress relaxation of a polymer. The higher the value of nRSI, the broader the relaxation time distribution of the polymer, and therefore the better the processability of the polymer (and further the composition). A higher RSI or nRSI indicates a higher molecular weight distribution in polymers with no long chain branching.

Surface roughness. The surface roughness of a coating is measured according to ANSI 1995 via a Surftest SV-400 Series 178 Surface Texture Measuring Instrument. A wire sample is placed in a V-Block and the stylus (10 urn) is lowered down to a specific start position (about 1 gram force is applied to wire). At a fixed rate of 2 (millimeter per second) the stylus is moved in the transverse direction taking measurements. Four readings per wire sample and four samples are tested which are then averaged with values reported in μ-inch.

Tensile properties. The present coating can be characterized by its tensile strength at break (in megapascals, MPa)

and elongation at break (%). Tensile strength ("TS") and elongation at break are measured in accordance with the ASTM D638 testing procedure on compression molded samples prepared according to ASTM D4703. Elongation at break ("TE"), or elongation to break, is the strain on a sample when it breaks, expressed as a percent. Aged tensile strength and aged elongation at break each are measured after a sample is held at a temperature of 100° C. for 10 days. Tensile strength retention is the aged tensile strength divided by the unaged tensile strength, and is expressed as a percentage. Elongation at break retention is the aged elongation at break divided by the unaged elongation at break, and is expressed as a percentage.

Tm or "melting point" is (also referred to as a melting peak in reference to the shape of the plotted DSC curve) measured by the DSC (Differential Scanning calorimetry) technique for measuring the melting points or peaks of polyolefins as described in U.S. Pat. No. 5,783,638. It should be noted that many blends comprising two or more polyolefins will have more than one melting point or peak; many individual polyolefins will comprise only one melting point or peak.

$^{13}$C NMR Experimental Procedure for Propylene/Ethylene Copolymers $^{13}$C NMR is used for ethylene content, Koenig B-value, triad distribution, and triad tacticity and is performed as follows:

Sample Preparation (Propylene/ethylene copolymers)—The samples are prepared by adding approximately 2.7 g of a 50/50 mixture of tetrachloroethane-d$_2$/orthodichlorobenzene containing 0.025 M Cr(AcAc)$_3$ to 0.20-0.30 g sample in a Norell 1001-7 10 mm NMR tube. The samples are dissolved and homogenized by heating the tube and its contents to 150° C. using a heating block and heat gun. Each sample is visually inspected to ensure homogeneity.

Data Acquisition Parameters (Propylene/ethylene copolymers)—The data is collected using a Bruker 400 MHz spectrometer equipped with a Bruker Dual DUL high-temperature CryoProbe. The data is acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and wt % ethylene is then determined according to methods commonly used in the art.*

*References: For composition (wt % E): S. Di Martino & M. Kelchtermans; 56 *J. Appl. Polym. Sci.* 1781-1787 (1995); Tacticity, detailed assignments: V. Busico & R. Cipullo; 26 *Prog. Polym. Sci.* 443-533 (2001).

The "Koenig B-value" or chi statistic is one measure of randomness or blockiness in a propylene/ethylene random copolymer. A value of 1.0 indicates a random copolymer and a value of zero indicates complete blocks of monomers A and B. A B-value of 2 indicates an alternating copolymer. B=[EP]/(2[P][E]), where [EP] is the total mole fraction of EP dimers (EP+PE, or (EEP+PPE+PEP+EPE)), and [E] is the mole fraction ethylene, and [P]=1-[E]. Jack L. Koenig, *Spectroscopy of Polymers* (2d ed. 1999).

$^1$H NMR Analysis—Total Unsaturation Per Mole Propylene

Samples are prepared by adding approximately 3.25 g of a 50/50 mixture of tetrachloroethane-d2/perchlorethylene that is 0.0015M in chromium acetylacetonate (relaxation agent) to 0.130 g sample in a 10 mm NMR tube. The samples are dissolved and homogenized by heating the tube and its contents to 110° C. The data is collected using a Bruker 400 MHz spectrometer equipped with a Bruker Dual DUL high-temperature CryoProbe. The unsaturation data is collected using 4 scans per data file, a 15.6 second pulse repetition delay with a sample temperature of 120° C. The acquisition is carried out using spectral width of 10,000 Hz and a file size of 16K data points. The presaturation experiment is run with a modified pulse sequence, Ic1prf2.zz1 using 100 scans per data file. The following calculations are used:

Moles of H from propylene: Mol fraction propylene*(integral area $\delta$3.5 – 0.2*ppm*)

Total moles propylene $$\frac{\text{moles } H \text{ from propylene}}{6 \text{ protons}}$$

Mol % vinyl unsaturation/mol propylene $$\frac{100*\text{moles vinyl}}{\text{Total moles propylene}}$$

Mol % *Cis/Trans* Unsaturation/mol propylene $$\frac{100*\text{moles } cis/trans}{\text{Total moles propylene}}$$

Mol % trisubstituted unsaturation/mol $$\frac{100*\text{moles } trisub}{\text{Total moles propylene}}$$

Mol % vinylidene unsaturation/mol propylene $$\frac{100*\text{moles vinylidene}}{\text{Total moles propylene}}$$

Total mol % unsaturation/mol propylene

Mol % vinyl + Mole *cis* &*trans* + Mol % *trisub* + Mol + vinylidene

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 µL. A "2 mg/mL" sample concentration is prepared by dissolving the sample in N$_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, *J. Appl. Polym. Sci.*, 29, 3763-3782 (1984))

and polystyrene (E. P. Otocka, R. J. Roe, N. Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad (Eq\ 1)$$

where $M_{pp}$ is PP equivalent MW, Mps is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\sum^i Wf_i}{\sum^i (Wf_i/M_i)}, \quad (Eq\ 2)$$

$$M_w = \frac{\sum^i (Wf_i * M_i)}{\sum^i (Wf_i)}, \quad (Eq\ 3)$$

where $Wf_i$ and $M_i$ are the weight fraction and molecular weight of elution component i, respectively.

DETAILED DESCRIPTION

The present disclosure provides a coated conductor. The coated conductor includes a conductor and an outermost coating on the conductor. The coating contains (A) an ethylene-based polymer having an I21/I2 ratio from 20 to 50; and (B) a propylene/ethylene copolymer having a Mw/Mn from 2.0 to 3.5. The coating has a surface roughness from 20μ-inch to 100 μ-inch.

i. Conductor

The coated conductor includes a conductor. The conductor may be a single-wire/fiber or a multi-wire/fiber and may be in strand form or in tubular form. Non-limiting examples of suitable conductors include carbon and various metals, such as silver, gold, copper, and aluminum. The conductor may also be optical fiber made from either glass or plastic. The conductor may or may not be disposed in a protective sheath.

In an embodiment, the conductor is a cable. A "cable" is a conductor whereby two or more wires, or two or more optical fibers, are bound together, optionally in a common insulation covering. The individual wires or fibers inside the covering may be bare, covered, or insulated. Combination cables may contain both electrical wires and optical fibers. The cable can be designed for low, medium, and/or high voltage applications.

The conductor may comprise two or more embodiments disclosed herein.

ii. Outermost Coating

The coated conductor includes an outermost coating on the conductor. The coating contains (A) an ethylene-based polymer having an I21/I2 ratio from 20 to 50; and (B) a propylene/ethylene copolymer having a Mw/Mn from 2.0 to 3.5; and (C) an optional additive.

A. Ethylene-Based Polymer

The coating includes (A) an ethylene-based polymer having an I21/I2 ratio from 20 to 50.

The ethylene-based polymer can be an ethylene homopolymer or an ethylene/α-olefin copolymer. Nonlimiting examples of suitable α-olefin comonomers for the ethylene-based polymer include $C_3$-$C_{20}$ α-olefin, or $C_4$-$C_{12}$ α-olefin, or $C_4$-$C_8$ α-olefin. Further nonlimiting examples of suitable α-olefin comonomer include propylene, butene, methyl-1-pentene, hexene, octene, decene, dodecene, tetradecene, hexadecene, octadecene, cyclohexyl-1-propene (allyl cyclohexane), vinyl cyclohexane, and combinations thereof. In an embodiment the α-olefin comonomer for the ethylene-based polymer is selected from butene, hexene, or octene.

In an embodiment, the ethylene-based polymer is selected from a LLDPE, a MDPE, a HDPE, and combinations thereof.

In an embodiment, the ethylene-based polymer is selected from a LLDPE, a MDPE, and combinations thereof.

The ethylene-based polymer has an I21/I2 ratio from 20 to 50. In an embodiment, the ethylene-based polymer has an I21/I2 ratio from 20, or 22, or 24 to 30, or 32, or 35, or 40, or 50.

In an embodiment, the ethylene-based polymer has a melting point, Tm, from 115° C., or 120° C. to 125° C., or 127° C., or 130° C.

In an embodiment, the ethylene-based polymer is a MDPE with an I21/I2 ratio from 20, or 22, or 25 to 27, or 30, or 32, or 35, or 40, or 45, or 50. The MDPE is an ethylene/$C_4$-$C_8$ α-olefin copolymer, or further an ethylene/octene copolymer. The MDPE has one, some, or all of the following properties: (i) a density from 0.926 g/cc, or 0.930 g/cc, or 0.935 g/cc to 0.940 g/cc; and/or (ii) an I2 from 0.5 g/10 min, or 1.0 g/10 min, or 1.5 g/10 min, or 2.0 g/10 min, or 2.4 g/10 min to 3.0 g/10 min, or 4.0 g/10 min, or 4.3 g/10 min, or 4.5 g/10 min; and/or (iii) an I21 from 35 g/10 min, or 40 g/10 min, or 50 g/10 min, or 60 g/10 min to 70 g/10 min, or 80 g/10 min, or 90 g/10 min, or 97 g/10 min, or 100 g/10 min; and/or (iv) an I10 from 5 g/10 min, or 10 g/10 min, or 11 g/10 min to 30 g/10 min, or 35 g/10 min, or 40 g/10 min; and/or (v) a melting point, Tm, from 120° C., or 122° C., or 125° C. to 127° C., or 130° C.; and/or (vi) a Mw/Mn from 2.5, or 2.7, or 3.0 to 3.3, or 3.5, or 4.0; and/or (vii) an nRSI from 10, or 15, or 19 to 83, or 85, or 90.

In an embodiment, the ethylene-based polymer is a LLDPE with an I21/I2 ratio from 20, or 22, or 24 to 30, or 31, or 32, or 35, or 40, or 45, or 50. The LLDPE is an ethylene/$C_4$-$C_8$ α-olefin copolymer, or further an ethylene/octene copolymer or an ethylene/hexene copolymer. The LLDPE has one, some, or all of the following properties: (i) a density from 0.916 g/cc, or 0.917 g/cc to 0.919 g/cc, or 0.920 g/cc, or 0.925 g/cc; and/or (ii) an I2 from 0.5 g/10 min, or 1.0 g/10 min, or 1.5 g/10 min, or 2.0 g/10 min, or 2.3 g/10 min to 3.0 g/10 min, or 4.0 g/10 min, or 4.3 g/10 min, or 4.5 g/10 min, or 5 g/10 min, or 10 g/10 min; and/or (iii) an I21 from 35 g/10 min, or 40 g/10 min, or 50 g/10 min, or 60 g/10 min, or 70 g/10 min, or 71 g/10 min to 80 g/10 min, or 87 g/10 min, or 90 g/10 min, or 100 g/10 min; and/or (iv) an I10 from 5 g/10 min, or 10 g/10 min, or 15 g/10 min, or 20 g/10 min to 25 g/10 min, or 30 g/10 min, or 35 g/10 min, or 40 g/10 min; and/or (v) a melting point, Tm, from 120° C., or 121° C. to 123° C., or 125° C., or 127° C., or 130° C.; and/or (vi) a Mw/Mn from 2.5, or 3.0, or 3.1 to 3.7, or 4.0, or 4.5, or 5.0; and/or (vii) an nRSI from 1, or 2 to 12, or 15, or 20, or 25, or 30.

In an embodiment, the ethylene-based polymer is a HDPE with an I21/I2 ratio from 20, or 25 to 30, or 35, or 40, or 45, or 50. The HDPE has a density from greater than 0.94 g/cc, or 0.945 g/cc, or 0.95 g/cc, or 0.955 g/cc to 0.96 g/cc, or 0.97 g/cc, or 0.98 g/cc.

In an embodiment, the coating contains from 60 wt %, 63 wt %, or 70 wt % to 75 wt %, or 80 wt %, or 84 wt %, or 85 wt %, or 90 wt % of the ethylene-based polymer, based on the total weight of the coating.

The ethylene-based polymer may comprise two or more embodiments disclosed herein.

B. Propylene/Ethylene Copolymer

The coating includes a propylene/ethylene copolymer having a Mw/Mn from 2.0 to 3.5.

In an embodiment, the propylene/ethylene copolymer contains, consists essentially of, or consists of, propylene, ethylene, an optional diene comonomer, and an optional additive.

In an embodiment, the propylene/ethylene copolymer contains propylene and from greater than 0 wt %, or 1 wt %, or 2 wt % to 5 wt %, or 10 wt %, or 15 wt %, or 20 wt %, or 25 wt % ethylene comonomer, based on the total weight of the propylene/ethylene copolymer.

In an embodiment, the propylene/ethylene copolymer contains, consists essentially of, or consists of, from less than 100 wt %, or 99 wt %, or 98 wt % to 97 wt %, or 96 wt %, or 95 wt % units derived from propylene and a reciprocal amount, or from greater than 0 wt %, or 1 wt %, or 2 wt % to 3 wt %, or 4 wt %, or 5 wt % units derived from ethylene, based on the total weight of the propylene/ethylene copolymer.

The propylene/ethylene copolymer has a Mw/Mn from 2.0 to 3.5, or has a Mw/Mn from 2.0 to less than 3.5. In an embodiment, the propylene/ethylene copolymer has a Mw/Mn from 2.0, or 2.4 to 3.3, or less than 3.5, or 3.5.

In an embodiment, the propylene/ethylene copolymer has a density from 0.880 g/cc, or 0.885 g/cc, or 0.887 g/cc to 0.890 g/cc, or 0.891 g/cc, or 0.895 g/cc, or 0.900 g/cc, or 0.905 g/cc.

In an embodiment, the propylene/ethylene copolymer has a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, or 15.0 g/10 min, or 20.0 g/10 min, or 25.0 g/10 min. In an embodiment, the propylene/ethylene copolymer has a melt flow rate (MFR) from 2.0 g/10 min to 10 g/10 min, or from 2.0 g/10 min to 8 g/10 min.

In an embodiment, the propylene/ethylene copolymer has an I2 from 0.5 g/10 min, or 0.8 g/10 min to 3.3 g/10 min, or 3.5 g/10 min, or 5.0 g/10 min, or 10 g/10 min.

In an embodiment, the propylene/ethylene copolymer has a total unsaturation per mole of propylene from 0.01%, or 0.015% to 0.025%, or 0.03%. The total unsaturation per mole of propylene is measured by $^1$H NMR analysis, as described above in the test methods section.

In an embodiment, the propylene/ethylene copolymer has a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %. In an embodiment, the propylene/ethylene copolymer has a crystallinity from 30 wt % to 70 wt %, or from 40 wt % to 60 wt %, or from 10 wt % to 40 wt %, or from 20 wt % to 39 wt %.

In an embodiment, the propylene/ethylene copolymer has a melting temperature, Tm, from 25° C., or 40° C., or 50° C., or 75° C., or 90° C., or 100° C., 105° C. to 110° C., or 120° C., or 140° C., or 150° C., or 160° C., or 170° C. In another embodiment, the propylene/ethylene copolymer has a melting temperature, Tm, from 25° C., or 40° C., or 50° C., or 75° C., or 100° C., or 105° C. to 110° C., or 115° C., or 116° C., or 120° C. In an embodiment, the propylene/ethylene copolymer has a single melting point.

In an embodiment, the propylene/ethylene copolymer has a weight average molecular weight (Mw) from 20,000 g/mol, or 24,000 g/mol, or 30,000 g/mol to 40,000 g/mol, or 48,000 g/mol, or 50,000 g/mol.

The term "B-value" is a measure of randomness and measures the distribution of the propylene and ethylene comonomer across the polymer chain of the propylene/ethylene copolymer. B-values range from 0 to 2. The higher the B-value, the more alternating the ethylene distribution in the propylene/ethylene copolymer. The lower the B-value, the more blocky or clustered the ethylene distribution in the propylene/ethylene copolymer. In an embodiment, the propylene/ethylene copolymer has a B-value of less than 1.0, or less than 0.99, or less than 0.98, or less than 0.97. In an embodiment, the propylene/ethylene copolymer has a B-value from 0.90, or 0.92, or 0.93, or 0.94 to 0.95, or 0.96, or 0.97, or 0.98, or 0.99.

The B-value as described by Koenig (*Spectroscopy of Polymers* (2d ed. 1999) is calculated as follows. B is defined for the propylene/ethylene copolymer as:

$$B = \frac{f(EP+PE)}{2 \cdot F_E \cdot F_P},$$

where f(EP+PE)=the sum of the EP and PE diad fractions; and Fe and Fp=the mole fraction of ethylene and propylene in the copolymer, respectively. The diad fraction can be derived from triad data according to: f(EP+PE)=[EPE]+[EPP+PPE]/2+[PEP]+[EEP+PEE]/2.

In an embodiment, propylene/ethylene copolymer is characterized as having substantially isotactic propylene sequences. "Substantially isotactic propylene sequences" are sequences having an isotactic triad (mm) measured by BC NMR of greater than 0.85, or greater than 0.90, or greater than 0.92, or greater than 0.93. Isotactic triads refer to the isotactic sequence in terms of a triad unit in the copolymer molecular chain determined by BC NMR spectroscopy.

In an embodiment, the propylene/ethylene copolymer has a RSI from 10, or 11, or 15 to 22, or 25, or 30.

In an embodiment, the propylene/ethylene copolymer has an nRSI from 15, or 18, or 19 to 30, or 31, or 35.

In an embodiment, the propylene/ethylene copolymer has a Mw/Mn from 2.0, or 2.4 to 3.3, or 3.5, and the propylene/ethylene copolymer optionally has one, some, or all of the following properties: (i) a density from 0.880 g/cc, or 0.885 g/cc, or 0.887 g/cc to 0.890 g/cc, or 0.891 g/cc, or 0.895 g/cc, or 0.900 g/cc, or 0.905 g/cc; and/or (ii) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, or 15.0 g/10 min, or 20.0 g/10 min, or 25.0 g/10 min; and/or (iii) from less than 100 wt %, or 99 wt %, or 98 wt % to 97 wt %, or 96 wt %, or 95 wt %, or 90 wt %, or 85 wt % units derived from propylene and a reciprocal amount, or from greater than 0 wt %, or 1 wt %, or 2 wt % to 3 wt %, or 4 wt %, or 5 wt %, or 10 wt %, or 15 wt % units derived from ethylene, based on the total weight of the propylene/ethylene copolymer; and/or (iv) a total unsaturation per mole of propylene from 0.01% to 0.025%, or 0.03%; and/or (v) a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %; and/or (vi) a melting temperature, Tm, from 25° C., or 50° C., or 75° C., or 100° C., or 105° C. to 110° C., or 115° C., or 116° C., or 120° C., or 140° C., or 150° C.; and/or (vii) a weight average molecular weight (Mw) from 20,000 g/mol, or 24,000 g/mol, or 30,000 g/mol to 40,000 g/mol, or 48,000 g/mol, or 50,000 g/mol; and/or (viii) a B-value from 0.90, or 0.93, or 0.94 to 0.95, or 0.96, or 0.97, or 0.98, or 0.99; and/or (ix) sequences having an isotactic triad (mm) measured by $^{13}$C NMR of greater than 0.85; and/or (x) an I2 from 0.5 g/10 min, or 0.8 g/10 min to 3.3 g/10 min, or 3.5 g/10 min, or 5.0 g/10 min, or 10 g/10 min; and/or (xi) a RSI from 10, or 11, or 15 to 22, or 25, or 30; and/or (xii) an nRSI from 15, or 18, or 19 to 30, or 31, or 35.

In an embodiment, the propylene/ethylene copolymer has at least 2, or at least 3, or at least 4, or at least 5, or at least 6, or at least 7, or at least 8, or at least 9, or at least 10, or at least 11, or all 12 of properties (i)-(xii), as listed in the paragraph immediately preceding this paragraph.

In an embodiment, the propylene/ethylene copolymer has (i) a Mw/Mn from 2.0, or 2.4 to 3.3, or 3.5; and (ii) a melting point, Tm, from 25° C., or 40° C., or 50° C., or 75° C., or 100° C., or 105° C. to 110° C., or 115° C., or 116° C., or 120° C., or 140° C., or 150° C.

The propylene/ethylene copolymer may be prepared as described in International Publication number WO 2009/067337, the entire contents of which are herein incorporated by reference.

In an embodiment, the propylene/ethylene copolymer is a propylene-based plastomer or elastomer. Nonlimiting examples of suitable propylene/ethylene copolymer that are propylene-based plastomers or elastomers are VERSIFY™ 3000 and VERSIFY™ 2000, available from The Dow Chemical Company.

In an embodiment, the coating contains from 10 wt %, or 15 wt % to 20 wt %, or 25 wt %, or 30 wt % of the propylene/ethylene copolymer, based on the total weight of the coating.

The propylene/ethylene copolymer may comprise two or more embodiments disclosed herein.

C. Optional Additive

In an embodiment, the coating includes one or more optional additives. Nonlimiting examples of suitable additives include carbon black, antioxidants, colorants, ultra violet (UV) absorbers or stabilizers, anti-blocking agents, flame retardants, compatibilizers, plasticizers, fillers, processing aids, and combinations thereof.

In an embodiment, the coating contains carbon black. A nonlimiting example of a suitable carbon black is DFNA-0037BK. In an embodiment, the coating contains from 1 wt %, or 2 wt %, or 3 wt %, or 5 wt % to 6 wt %, or 7 wt %, or 9 wt %, or 10 wt % carbon black, based on the total weight of the coating.

In an embodiment, the coating contains an antioxidant. Nonlimiting examples of suitable antioxidants include phenolic antioxidants, thio-based antioxidants, phosphate-based antioxidants, and hydrazine-based metal deactivators. In an embodiment, the coating contains an antioxidant, such as IRGANOX 1035, in an amount from 0.05 wt %, or 0.07 wt % to 0.1 wt %, or 0.2 wt %, or 0.3 wt %, or 0.4 wt %, or 0.5 wt %, based on the total weight of the coating.

In an embodiment, the coating contains a stabilizer. A nonlimiting example of a suitable stabilizer is NAUGARD SUPER Q, available from Chemtura. In an embodiment, the coating contains from 0.1 wt %, or 0.2 wt % to 0.3 wt %, or 0.4 wt %, or 0.5 wt % stabilizer, based on the total weight of the coating.

In an embodiment, the coating contains a filler. Nonlimiting examples of suitable fillers include zinc oxide, zinc borate, zinc molybdate, zinc sulfide, organo-clay, and combinations thereof. The filler may or may not have flame retardant properties.

In an embodiment, the coating contains a processing aid. Nonlimiting examples of suitable processing aids include oils, organic acids (such as stearic acid), and metal salts of organic acids (such as zinc stearate). In a further embodiment, the coating contains a processing aid, such as DYNAMAR FX 5912, in an amount from 0.01 wt %, or 0.02 wt % to 0.05 wt %, or 0.10 wt %, or 0.15 wt %, or 0.20 wt %, or 0.25 wt %, or 0.30 wt %, or 0.34 wt %, or 0.35 wt %, based on total weight of the coating.

In an embodiment, the coating contains an additive selected from carbon black, an antioxidant, a stabilizer, a processing aid, and combinations thereof. In another embodiment, the coating contains an additive selected from carbon black, a stabilizer, a processing aid, and combinations thereof.

The optional additive may comprise two or more embodiments disclosed herein.

The coating contains (A) an ethylene-based polymer having an I21/I2 ratio from 20 to 50; and (B) a propylene/ethylene copolymer having a Mw/Mn from 2.0 to 3.5; and (C) an optional additive. The coating has a surface roughness from 20 μ-inch to 100 μ-inch. In an embodiment, the coating has a surface roughness from 20 μ-inch, or 25 μ-inch, or 30 μ-inch, or 34 μ-inch to 55 μ-inch, or 60 μ-inch, or 70 μ-inch, or 75 μ-inch, or 80 μ-inch, or 85 μ-inch, or 86μ-inch, or 89 μ-inch, or 90 μ-inch, or 95 μ-inch, or 100 μ-inch. The surface roughness of 20-100μ-inch provides aesthetic and customer satisfaction.

In an embodiment, the coating has a density from 0.919 g/cc, or 0.920 g/cc to 0.942 g/cc, or 0.965 g/cc, or 0.975 g/cc.

In an embodiment, the coating has an I2 from 0.5 g/10 min, or 1.0 g/10 min, or 2.0 g/10 min, or 2.2 g/10 min, or 2.4 g/10 min, or 2.5 g/10 min to 3.0 g/10 min, or 3.2 g/10 min, or 3.3 g/10 min, or 3.5 g/10 min.

In an embodiment, the coating has a tensile strength (TS) from 12 MPa, or 14 MPa, or 15 MPa, or 17 MPa, or 18 MPa to 24 MPa, or 25 MPa, or 30 MPa.

In an embodiment, the coating has an aged tensile strength (after 10 days at 100° C.) from 10 MPa, or 13 MPa, or 14 MPa, or 14.5 MPa, or 15 MPa, or 20 MPa to 23 MPa, or 24 MPa, or 25 MPa, or 26 MPa, or 30 MPa.

In an embodiment, the coating has a tensile strength retention from 85%, or 86%, or 100%, or 101%, or 104% to 110%, or 115%, or 120%.

In an embodiment, the coating has an elongation at break (TE) from 135%, or 136%, or 175%, or 177%, or 200%, or 300%, or 400%, or 500%, or 600% to 900%, or 1000%, or 2000%.

In an embodiment, the coating has an aged elongation at break (after 10 days at 100° C.) from 40%, or 80%, or 100%, or 200%, or 300%, or 400%, or 450%, or 500%, or 600%, or 700% to 800%, or 900%, or 1000%, or 1500%, or 2000%.

In an embodiment, the coating has an elongation at break retention from 30%, or 40%, or 45%, or 50%, or 70%, or 80%, or 85%, or 100% to 108%, or 110%, or 115%, or 120%.

In an embodiment, the coating has an RSI from 1.0, or 2.5, or 2.7, or 5.0, or 8.0, or 8.5, or 9.0, or 9.4 to 15.0, or 16.0, or 20.0, or 22.5, or 23.0.

In an embodiment, the coating has an nRSI from 4.0, or 4.2, or 7.0, or 9.0, or 10.0, or 11.0, or 12.0, or 12.5 to 22.0, or 22.5, or 23.0, or 25.0, or 30.0, or 33.5, or 34.0, or 35.0.

In an embodiment, the coating is capable of being extruded through a die head at a pressure that is equal to or less than the pressure of a comparable coating that lacks the (B) propylene/ethylene copolymer, under the same extrusion conditions. In other words, the pressure head of the present coating is equal to or less than the pressure head of a comparable coating that lacks the (B) propylene/ethylene copolymer. Decreased pressure head is advantageous because it enables faster line speed. Consequently, decreased pressure head indicates improved productivity of a line.

In an embodiment, the coating contains, consists essentially of, or consists of: (A) from 60 wt %, or 63 wt %, or 70 wt % to 75 wt %, or 80 wt %, or 84 wt %, or 85 wt %, or 90 wt % of an ethylene-based polymer having an I21/I2 ratio from 20, or 22, or 24 to 32, or 35, or 40, or 45, or 50; (B) from 10 wt %, or 15 wt % to 20 wt %, or 25 wt %, or 30 wt % of a propylene/ethylene copolymer having a Mw/Mn from 2.0, or 2.4 to 3.3, or 3.5; (C) optionally, from 0 wt %, or 0.01 wt % to 1 wt %, or 5 wt %, or 6 wt %, or 7 wt %, or 10 wt %, or 12 wt %, or 15 wt % of an additive selected from carbon black, an antioxidant, a stabilizer, a processing aid, and combinations thereof; and the coating has a surface roughness from 20 µ-inch to 100 µ-inch. The coating has a surface roughness from 20 µ-inch, or 25 µ-inch, or 30 µ-inch, or 34 µ-inch to 55 µ-inch, or 60µ-inch, or 70 µ-inch, or 75 µ-inch, or 80 µ-inch, or 85 µ-inch, or 86 µ-inch, or 89 µ-inch, or 90µ-inch, or 95 µ-inch, or 100 µ-inch; and the coating optionally has one, some, or all of the following properties: (i) a density from 0.919 g/cc, or 0.920 g/cc to 0.942 g/cc, or 0.965 g/cc, or 0.975 g/cc; and/or (ii) an I2 from 0.5 g/10 min, or 1.0 g/10 min, or 2.0 g/10 min, or 2.2 g/10 min, or 2.4 g/10 min, or 2.5 g/10 min to 3.0 g/10 min, or 3.2 g/10 min, or 3.3 g/10 min, or 3.5 g/10 min; and/or (iii) a tensile strength (TS) from 12 MPa, or 14 MPa, or 15 MPa, or 17 MPa, or 18 MPa to 24 MPa, or 25 MPa, or 30 MPa; and/or (iv) an aged tensile strength from 10 MPa, or 13 MPa, or 14 MPa, or 14.5 MPa, or 15 MPa, or 20 MPa to 23 MPa, or 24 MPa, or 25 MPa, or 26 MPa, or 30 MPa; and/or (v) a tensile strength retention from 85%, or 86%, or 100%, or 101%, or 104% to 110%, or 115%, or 120%; and/or (vi) an elongation at break (TE) from 135%, or 136%, or 175%, or 177%, or 200%, or 300%, or 400%, or 500%, or 600% to 900%, or 1000%, or 1500%, or 2000%; and/or (vii) an aged elongation at break from 40%, or 80%, or 100%, or 200%, or 300%, or 400%, or 450%, or 500%, or 600%, or 700% to 800%, or 900%, or 1000%, or 1500%, or 2000%; and/or (viii) an elongation at break retention from 30%, or 40%, or 45%, or 50%, or 70%, or 80%, or 85%, or 100% to 108%, or 110%, or 115%, or 120%; and/or (ix) an RSI from 1.0, or 2.5, or 2.7, or 5.0, or 8.0, or 8.5, or 9.0, or 9.4 to 15.0, or 16.0, or 20.0, or 22.5, or 23.0; and/or (x) an nRSI from 4.0, or 4.2, or 7.0, or 9.0, or 10.0, or 11.0, or 12.0, or 12.5 to 22.0, or 22.5, or 23.0, or 25.0, or 30.0, or 33.5, or 34.0, or 35.0.

It is understood that the sum of the components in each of the coatings disclosed herein, including the foregoing coating, yields 100 wt %.

In an embodiment, the coating is a blend of only two polymeric components—the (A) ethylene-based polymer having an I21/I2 ratio from 20 to 50 and (B) the propylene/ethylene copolymer having a Mw/Mn from 2.0 to 3.5. It is understood that a coating blend containing only two polymeric components may optionally include non-polymeric additives.

In an embodiment, the coating excludes, or is void of, or substantially void of, LDPE.

In an embodiment, the coating excludes, or is void of, or substantially void of, ethylene-based polymer having an I21/I2 ratio greater than 50.

In an embodiment, the coating excludes, or is void of, or substantially void of, gas phase polymerization resins (GP resins).

The coating may be formed by way of melt blending. "Melt blending" is a process whereby at least two components are combined or otherwise mixed together, and at least one of the components is in a melted state. The melt blending may be accomplished by way of batch mixing, extrusion blending, extrusion molding, and any combination thereof.

In an embodiment, the coating is extruded over the conductor. The extruder has a crosshead die, which provides the desired layer (wall or coating) thickness. A nonlimiting example of an extruder, which can be used is the single screw type modified with a crosshead die, cooling through and continuous take-up equipment. A typical single screw type extruder can be described as one having a hopper at its upstream end and a die at its downstream end. The hopper feeds into the barrel, which contains a screw. At the downstream end, between the end of the screw and the die are a screen pack and a breaker plate. The screw portion of the extruder is considered to be divided up into three sections, the feed section, the compression section, and the metering section, and multiple heating zones from the rear heating zone to the front heating zone with the multiple sections running from upstream to downstream. The length to diameter ratio of the barrel is in the range of 16:1 to 30:1. Grooved barrel extruders or twin screw extruders can also be employed in the core coating process. The jacketing extrusion process can take place at temperatures in the range from 160° C., or 180° C., or 200° C. to 220° C., or 240° C., or 260° C. The crosshead die distributes the coating composition in a flow channel such that the melted coating composition exits with a uniform velocity and is applied to the conductor. In this way, the blending (melt blending) and the extrusion are performed in the same, single extruder. The conductor passes through the center of the crosshead, and as it exits, a uniform layer of the coating is circumferentially applied using either pressure, or semi-pressure of tube-on tooling. One or more layers of the coating (or other material) can be applied using a multiple crosshead. The coated conductor is then cooled in a water trough sufficiently to prevent deformation of the applied coating layer on the take-up reel, yielding a coated conductor.

Melt blending may occur sequentially before the extrusion. Alternatively, melt blending may occur simultaneously, or substantially simultaneously with the extrusion (i.e., melt blending and extrusion occurring in the same extruder). The carbon black may be added during the melt blending and/or during the extrusion.

The coating is an outermost coating. An "outermost coating" is a layer with an outer surface that is exposed to, or substantially exposed to, ambient environment. The coating may be the sole component surrounding the conductor. Alternatively, the coating may be the outermost layer of a multilayer jacket or a multilayer sheath encasing the conductor.

In an embodiment, the coating directly contacts the conductor. The term "directly contacts," as used herein, is a coating configuration whereby the outermost coating is located immediately adjacent to the conductor, the outermost coating touches the conductor, and no intervening layers, no intervening coatings, and/or no intervening structures, are present between the outermost coating and the conductor.

In another embodiment, the outermost coating indirectly contacts the conductor. The term "indirectly contacts," as used herein, is a coating configuration whereby an intervening layer, an intervening coating, or an intervening structure, is present between the outermost coating and the conductor. Nonlimiting examples of suitable intervening layers, intervening coatings, and intervening structures include insulation layers, moisture barrier layers, buffer tubes, and combinations thereof.

In an embodiment, an insulation layer directly contacts the conductor, and the outermost coating directly contacts the insulation layer. In other words, the coating directly contacts an insulation layer surrounding the conductor. Nonlimiting examples of suitable insulation layers include foamed insulation layers, thermoplastic insulation layers, crosslinked insulation layers, and combinations thereof.

In an embodiment, the coated conductor includes a plurality of conductors that are optical fibers, and the optical fibers are disposed in a buffer tube, the coating surrounding the buffer tube. The optical fibers may be disposed in a single buffer tube, or in a plurality of buffer tubes.

In an embodiment, the coating has a thickness from 0.254 mm to 0.500 mm, or 0.600 mm, or 0.700 mm, or 1.00 mm, or 1.50 mm, or 2.00 mm, or 3.00 mm, or 3.18 mm.

In an embodiment, the coated conductor contains, consists essentially of, or consists of:
a conductor;
an outermost coating on the conductor, the coating containing, consisting essentially of, or consisting of:
(A) from 60 wt %, or 63 wt %, or 70 wt % to 75 wt %, or 80 wt %, or 84 wt %, or 85 wt %, or 90 wt % of an ethylene-based polymer that is an MDPE (e.g., an ethylene/$C_4$-$C_8$ α-olefin copolymer, or further an ethylene/octene copolymer) having an I21/I2 from 20, or 22, or 25 to 27, or 30, or 32, or 35, or 40, or 45, or 50; the MDPE having one, some, or all of the following properties:
(i) a density from 0.926 g/cc, or 0.930 g/cc, or 0.935 g/cc to 0.940 g/cc; and/or
(ii) an I2 from 0.5 g/10 min, or 1.0 g/10 min, or 1.5 g/10 min, or 2.0 g/10 min, or 2.4 g/10 min to 3.0 g/10 min, or 4.0 g/10 min, or 4.3 g/10 min, or 4.5 g/10 min; and/or
(iii) an I21 from 35 g/10 min, or 40 g/10 min, or 50 g/10 min, or 60 g/10 min to 70 g/10 min, or 80 g/10 min, or 90 g/10 min, or 97 g/10 min, or 100 g/10 min; and/or
(iv) an I10 from 5 g/10 min, or 10 g/10 min, or 11 g/10 min to 30 g/10 min, or 35 g/10 min, or 40 g/10 min; and/or
(v) a melting point, Tm, from 120° C., or 122° C., or 125° C. to 127° C., or 130° C.; and/or
(vi) a Mw/Mn from 2.5, or 2.7, or 3.0 to 3.3, or 3.5, or 4.0; and/or
(vii) an nRSI from 10, or 15, or 19 to 83, or 85, or 90;
(B) from 10 wt %, or 15 wt % to 20 wt %, or 25 wt %, or 30 wt % of a propylene/ethylene copolymer having a Mw/Mn from 2.0, or 2.4 to 3.3, or 3.5; the propylene/ethylene copolymer having one, some, or all of the following properties:
(i) a density from 0.880 g/cc, or 0.885 g/cc, or 0.887 g/cc to 0.890 g/cc, or 0.891 g/cc, or 0.895 g/cc, or 0.900 g/cc, or 0.905 g/cc; and/or (ii) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, or 15.0 g/10 min, or 20.0 g/10 min, or 25.0 g/10 min; and/or
(iii) from less than 100 wt %, or 99 wt %, or 98 wt % to 97 wt %, or 96 wt %, or 95 wt %, or 90 wt %, or 85 wt % units derived from propylene and a reciprocal amount, or from greater than 0 wt %, or 1 wt %, or 2 wt % to 3 wt %, or 4 wt %, or 5 wt %, or 10 wt %, or 15 wt % units derived from ethylene, based on the total weight of the propylene/ethylene copolymer; and/or
(iv) a total unsaturation per mole of propylene from 0.01% to 0.025%, or 0.03%; and/or
(v) a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %; and/or
(vi) a melting temperature, Tm, from 25° C., or 50° C., or 75° C., or 100° C., or 105° C. to 110° C., or 115° C., or 116° C., or 120° C., or 140° C., or 150° C.; and/or
(vii) a weight average molecular weight (Mw) from 20,000 g/mol, or 24,000 g/mol, or 30,000 g/mol to 40,000 g/mol, or 48,000 g/mol, or 50,000 g/mol; and/or
(viii) a B-value from 0.90, or 0.94 to 0.95, or 0.96, or 0.97, or 0.98, or 0.99; and/or
(ix) sequences having an isotactic triad (mm) measured by $^{13}$C NMR of greater than 0.85; and/or
(x) an I2 from 0.5 g/10 min, or 0.8 g/10 min to 3.3 g/10 min, or 3.5 g/10 min, or 5.0 g/10 min, or 10 g/10 min; and/or
(xi) a RSI from 10, or 11, or 15 to 22, or 25, or 30; and/or
(xii) an nRSI from 15, or 18, or 19 to 30, or 31, or 35; and
(C) from 0 wt %, or 0.01 wt % to 1 wt %, or 5 wt %, or 6 wt %, or 7 wt %, or 10 wt %, or I2 wt %, or 15 wt % of an additive selected from carbon black, an antioxidant, a stabilizer, a processing aid, and combinations thereof; and
the coating has a surface roughness from 30 μ-inch, or 50 μ-inch, or 60 μ-inch, or 70μ-inch, or 80 μ-inch, or 85 μ-inch to 90 μ-inch, or 95 μ-inch, or 100 μ-inch; and
the coating optionally has one, some, or all of the following properties: (i) a density from 0.925 g/cc, or 0.930 g/cc, or 0.935 g/cc, or 0.939 g/cc, or 0.940 g/cc to 0.941 g/cc, or 0.942 g/cc, or 0.946 g/cc, or 0.950 g/cc, or 0.960 g/cc, or 0.965 g/cc, or 0.975 g/cc; and/or (ii) an I2 from 2.0 g/10 min, or 2.2 g/10 min, or 2.4 g/10 min, or 2.5 g/10 min to 3.2 g/10 min, or 3.3 g/10 min, or 3.5 g/10 min; and/or (iii) a tensile strength (TS) from 20 MPa, or 21 MPa to 24 MPa, or 25 MPa, or 30 MPa; and/or (iv) an aged tensile strength from 20 MPa, or 22 MPa to 23 MPa, or 24 MPa, or 25 MPa, or 26 MPa, or 30 MPa; and/or (v) a tensile strength retention from 100%, or 101%, or 104% to 110%, or 115%, or 120%; and/or (vi) an elongation at break (TE) from 135%, or 136%, or 175%, or 177%, or 200%, or 300% to 600%, or 900%, or 1000%; and/or (vii) an aged elongation at break from 40%, or 80%, or 100%, or 200% to 450%, or 500%, or 600%, or 700%, or 800%, or 900%, or 1000%; and/or (viii) an elongation at break retention from 30%, or 40% to 70%, or 75%, or 80%, or 85%, or 100%, or 110%; and/or (ix) an RSI from 8.0, or 8.5, or 8.9, or 9.0, or 9.4 to 13.0, or 15.0, or 20.0;

and/or (x) an nRSI from 12.0, or 15.0, or 16.0, or 16.8 to 20.8, or 21.0, or 22.0, or 25.0.

In an embodiment, the coated conductor contains, consists essentially of, or consists of:
  a conductor;
  an outermost coating on the conductor, the coating containing, consisting essentially of, or consisting of:
  (A) from 60 wt %, or 63 wt %, or 70 wt % to 75 wt %, or 80 wt %, or 84 wt %, or 85 wt %, or 90 wt % of an ethylene-based polymer that is a LLDPE (e.g., an ethylene/$C_4$-$C_8$ α-olefin copolymer, or further an ethylene/octene copolymer or an ethylene/hexene copolymer) with an I21/I2 ratio from 20, or 22, or 24 to 30, or 31, or 32, or 35, or 40, or 45, or 50; the LLDPE having one, some, or all of the following properties:
    (i) a density from 0.916 g/cc, or 0.917 g/cc to 0.919 g/cc, or 0.920 g/cc, or 0.925 g/cc; and/or
    (ii) an I2 from 0.5 g/10 min, or 1.0 g/10 min, or 1.5 g/10 min, or 2.0 g/10 min, or 2.3 g/10 min to 3.0 g/10 min, or 4.0 g/10 min, or 4.3 g/10 min, or 4.5 g/10 min, or 5 g/10 min, or 10 g/10 min; and/or
    (iii) an I21 from 35 g/10 min, or 40 g/10 min, or 50 g/10 min, or 60 g/10 min, or 70 g/10 min, or 71 g/10 min to 80 g/10 min, or 87 g/10 min, or 90 g/10 min, or 100 g/10 min; and/or
    (iv) an I10 from 5 g/10 min, or 10 g/10 min, or 15 g/10 min, or 20 g/10 min to 25 g/10 min, or 30 g/10 min, or 35 g/10 min, or 40 g/10 min; and/or
    (v) a melting point, Tm, from 120° C., or 121° C. to 123° C., or 125° C., or 127° C., or 130° C.; and/or
    (vi) a Mw/Mn from 2.5, or 3.0, or 3.1 to 3.7, or 4.0, or 4.5, or 5.0; and/or
    (vii) an nRSI from 1, or 2 to 12, or 15, or 20; and
  (B) from 10 wt %, or 15 wt % to 20 wt %, or 25 wt %, or 30 wt % of a propylene/ethylene copolymer having a Mw/Mn from Mw/Mn from 2.0, or 2.4 to 3.3, or 3.5; the propylene/ethylene copolymer having one, some, or all of the following properties:
    (i) a density from 0.880 g/cc, or 0.885 g/cc, or 0.887 g/cc to 0.890 g/cc, or 0.891 g/cc, or 0.895 g/cc, or 0.900 g/cc, or 0.905 g/cc; and/or
    (ii) a melt flow rate (MFR) from 2.0 g/10 min, or 3.0 g/10 min, or 4.0 g/10 min to 5.0 g/10 min, or 6.0 g/10 min, or 7.0 g/10 min, or 8.0 g/10 min, or 9.0 g/10 min, or 10.0 g/10 min, or 15.0 g/10 min, or 20.0 g/10 min, or 25.0 g/10 min; and/or
    (iii) from less than 100 wt %, or 99 wt %, or 98 wt % to 97 wt %, or 96 wt %, or 95 wt %, or 90 wt %, or 85 wt % units derived from propylene and a reciprocal amount, or from greater than 0 wt %, or 1 wt %, or 2 wt % to 3 wt %, or 4 wt %, or 5 wt %, or 10 wt %, or 15 wt % units derived from ethylene, based on the total weight of the propylene/ethylene copolymer; and/or
    (iv) a total unsaturation per mole of propylene from 0.01% to 0.025%, or 0.03%; and/or
    (v) a crystallinity from 1 wt %, or 10 wt %, or 15 wt %, or 20 wt %, or 25 wt %, or 30 wt % to 35 wt %, or 40 wt %, or 45 wt %, or 50 wt %, or 55 wt %, or 60 wt %, or 65 wt %, or 70 wt %; and/or
    (vi) a melting temperature, Tm, from 25° C., or 50° C., or 75° C., or 100° C., or 105° C. to 110° C., or 115° C., or 116° C., or 120° C., or 140° C., or 150° C.; and/or
    (vii) a weight average molecular weight (Mw) from 20,000 g/mol, or 24,000 g/mol, or 30,000 g/mol to 40,000 g/mol, or 48,000 g/mol, or 50,000 g/mol; and/or
    (viii) a B-value from 0.90, or 0.94 to 0.95, or 0.96, or 0.97, or 0.98, or 0.99; and/or
    (ix) sequences having an isotactic triad (mm) measured by $^{13}$C NMR of greater than 0.85; and/or
    (x) an I2 from 0.5 g/10 min, or 0.8 g/10 min to 3.3 g/10 min, or 3.5 g/10 min, or 5.0 g/10 min, or 10 g/10 min; and/or
    (xi) a RSI from 10, or 11, or 15 to 22, or 25, or 30; and/or
    (xii) an nRSI from 15, or 18, or 19 to 30, or 31, or 35; and
  (C) from 0 wt %, or 0.01 wt % to 1 wt %, or 5 wt %, or 6 wt %, or 7 wt %, or 10 wt %, or 12 wt %, or 15 wt % of an additive selected from carbon black, an antioxidant, a stabilizer, a processing aid, and combinations thereof; and
  the coating has a surface roughness from 30 μ-inch, or 34 μ-inch to 55 μ-inch, or 67μ-inch, or 70 μ-inch, or 75 μ-inch, or 80 μ-inch; and
  the coating has one, some, or all of the following properties: (i) a density from 0.919 g/cc, or 0.920 g/cc, or 0.922 g/cc to 0.925 g/cc, or 0.930 g/cc, or 0.933 g/cc, or 0.935 g/cc, or 0.940 g/cc; and/or (ii) an I2 from 2.0 g/10 min, or 2.2 g/10 min, or 2.4 g/10 min, or 2.5 g/10 min to 2.6 g/10 min, or 3.0 g/10 min, or 3.2 g/10 min, or 3.3 g/10 min, or 3.5 g/10 min; and/or (iii) a tensile strength (TS) from 30 MPa, or 34 MPa, or 35 MPa to 67 MPa, or 70 MPa, or 75 MPa, or 80 MPa, or 90 MPa; and/or (iv) an aged tensile strength from 10 MPa, or 13 MPa, or 13.5 MPa, or 14 MPa, or 15 MPa to 21 MPa, or 25 MPa, or 30 MPa; and/or (v) a tensile strength retention from 55%, or 59%, or 85%, or 86%, or 100% to 110%, or 115%; and/or (vi) an elongation at break (TE) from 500%, or 600% to 900%, or 1000%, or 1500%; and/or (vii) an aged elongation at break from 300%, or 400%, or 450%, or 500% to 800%, or 900%, or 1000%, or 1500%; and/or (viii) an elongation at break retention from 60%, or 70%, or 80% to 106%, or 110%, or 115%, or 120%; and/or (ix) an RSI from 2.5, or 2.7, or 4.0, or 4.4, or 5.0, or 9.0, or 9.4 to 15.0, or 20.0, or 22.5, or 23.0, or 25.0; and/or (x) an nRSI from 4.0, or 4.2, or 5.0, or 7.0, or 10.0, or 12.0, or 12.5 to 22.0, or 25.0, or 30.0, or 33.5, or 34.0, or 35.0.

In an embodiment, the coated conductor excludes, or is void of, or substantially void of, LDPE.

In an embodiment, the coated conductor excludes, or is void of, or substantially void of, ethylene-based polymer having an I21/I2 ratio greater than 50.

In an embodiment, the coated conductor is selected from a fiber optic cable, a communications cable (such as a telephone cable or a local area network (LAN) cable), a power cable, wiring for consumer electronics, a power charger wire for cell phones and/or computers, computer data cords, power cords, appliance wiring material, home interior wiring material, consumer electronic accessory cords, and any combination thereof.

The present coating containing the combination of (A) an ethylene-based polymer having an I21/I2 ratio from 20 to 50 and (B) a propylene/ethylene copolymer having a Mw/Mn from 2.0 to 3.5 advantageously provides improved surface roughness (20-100 μ-inch) for outermost conductor coatings, while improving tensile strength and tensile elongation for the coating.

By way of example, and not limitation, some embodiments of the present disclosure will now be described in detail in the following Examples.

EXAMPLES

The materials used in the inventive examples and in the comparative samples are provided in Table 1 below.

TABLE 1

| Material | Composition | Density (g/cc) | Tm (° C.) | I2 (g/ 10 min) | I21 (g/ 10 min) | I21/ I2 | I10 (g/ 10 min) | MFR (g/ 10 min) | Mw/ Mn | RSI (at 190° C., 0.25% strain, 25 mm plates) | nRSI |
|---|---|---|---|---|---|---|---|---|---|---|---|
| DOWLEX 2247G[1] | LLDPE ethylene/octene copolymer | 0.917 | 123 | 2.38 | 71.18 | 29.9 | 20.88 | — | 3.7 | 3.9 | 6.0 |
| Polymer A[1] | LLDPE ethylene/hexene copolymer | 0.919 | — | 2.9 | 87 | 30 | 29.1 | — | 3.7 | 7.0 | 11.9 |
| DOWLEX GM 8480F[1] | LLDPE ethylene/hexene copolymer | 0.917 | 121 | 3.0 | 74.82 | 24.9 | 22.8 | — | 3.1 | 1.5 | 2.6 |
| DFH-2065[1] | LLDPE; GP Resin ethylene-based copolymer | 0.920 | — | 0.65 | 49 | 75 | 9.8 | — | 9.4 | 40.4 | 32.6 |
| DOWLEX 2027G[1] | MDPE ethylene/octene copolymer | 0.940 | 127 | 4.28 | 96.11 | 22.5 | 29.94 | — | 3.0 | 9.5 | 19.7 |
| DOWLEX 2036G[1] | MDPE ethylene/octene copolymer | 0.935 | 125 | 2.42 | 60.93 | 27 | 11.58 | — | 3.3 | 1.9 | 82.9 |
| DFH-3580H[1] | MDPE; GP Resin ethylene-based copolymer | 0.935 | — | 0.80 | 52 | 65 | 23.9 | — | 13.3 | 92.7 | 82.9 |
| VERSIFY 2000[1] | Plastomer propylene/ethylene copolymer (4.5 wt % ethylene) | 0.887 | 107 | 0.83 | 66 | 79.5 | 12.3 | 2.0 | 2.7 | 21.14 | 19.21 |
| VERSIFY 3000[1] | Plastomer propylene/ethylene copolymer (4.5 w % ethylene) | 0.891 | 108 | 3.30 | 231 | 70 | 47.2 | 8.0 | 2.4 | 16.63 | 30.23 |
| Polymer B[1] | Plastomer propylene/ethylene copolymer | 0.898 | >130 | 3.5 | 268.6 | 76.7 | 50.2 | — | 2.6 | 11.3 | 21.1 |
| MOPLEN RP323[2] | Random Copolymer propylene/ethylene copolymer | 0.900 | — | 3.1 | 215.2 | 69.4 | 39.9 | 8.0 | 3.3 | 15.7 | 27.6 |
| PRO-FAX PD702[2] | Propylene Homopolymer | 0.900 | — | 13.06 | — | — | 36.6 | 35 | 3.2 | 4.92 | 17.78 |
| PRO-FAX RP448S[2] | Random Copolymer propylene/ethylene copolymer | 0.900 | — | 17.04 | — | — | 26.3 | 40 | 3.9 | 9.15 | 37.78 |
| DFNA-0037BK[1] | carbon black masterbatch | 1.21 | — | — | — | — | — | — | — | — | — |
| DYNAMAR FX 5912[3] | processing aid | 1.93 | — | — | — | — | — | — | — | — | — |
| IRGANOX 1035[4] | antioxidant additive | 1.072 | — | — | — | — | — | — | — | — | — |
| NAUGARD Super Q[5] | stabilizer (CAS 26780-96-1) | 1.09 | — | — | — | — | — | — | — | — | — |

[1] Available from The Dow Chemical Company
[2] Available from LyondellBasell
[3] Available from 3M
[4] Available from BASF
[5] Available from Chemtura The carbon black masterbatch (DFNA-0037BK), processing aid (DYNAMAR FX 5912), antioxidant additive (IRGANOX 1035), and stabilizer (NAUGARD Super Q) are dry blended with LLDPE pellets or MDPE pellets to form powder-coated ethylene-based polymer pellets. The powder-coated ethylene-based polymer pellets and the propylene-based polymer are mixed in a Brabender Extruder equipped with a Maddock mixing screw with the conditions provided below in Table A. The mixture is fed through a strand die at the end of th extruder. After exiting the extruder, the strands are fed through a Berlyn pelletizer to form coating composition pellets.

TABLE A

Brabender Extruder Conditions

| | |
|---|---|
| Heat Zone 1 = 180° C. | Screw RPM = 60 |
| Heat Zone 2 = 200° C. | Line Speed = 50 ft/min |
| Heat Zone 3 = 220° C. | Melt Temperature = 231° C. |
| Heat Zone 4 = 210° C. | Single Strand Die Size = 0.145 |
| Screw = Maddock mixing screw | Breaker Plate Pressure = 200-300 PSI |

Coated conductors are prepared by extrusion by adding the coating composition pellets to a Brabender Mini-Wire Line extruder. The extrusion conditions are provided below in Table B. This equipment is used to generate samples with a final diameter of approximately 21.84 mm (0.86 inches) and a coating thickness of approximately 0.254 mm (0.01 inches), on a 14 American Wire Gauge (AWG) solid copper conductor (1.63 mm/0.064 in diameter).

TABLE B

Brabender Mini-Wire Line Extrusion Conditions

| | |
|---|---|
| Heat Zones 1-4 = 210° C. | Screw RPM = 50 |
| Line Speed = 50 ft/min | Melt Temperature = 218° C. |
| Die Size = 0.08 in | Tubing Tip Size = 0.067 in |
| Finished Diameter = 0.082 in | Cooling Water Temperature = 35-40° C. |
| Coating Thickness = 0.01 in | Screw = ¾ inch diameter; 25:1, L:D |

General purpose polyethylene type extruder with no mixing section

Qualitative smoothness is visually determined. In Table 2, a qualitative smoothness of "+" indicates a smooth wire surface and a qualitative smoothness of "++" indicates a very smooth wire surface. A qualitative smoothness of "−−" indicates a rough wire surface.

Properties for comparative samples and inventive examples of coatings are provided in Table 2 below.

TABLE 2

| | CS 1 | CS 2 | CS 3 | CS 4 | Ex 5 | Ex 6 | Ex 7 | Ex 8 | Ex 9 | CS 10 |
|---|---|---|---|---|---|---|---|---|---|---|
| DFH-2065 (LLDPE; I21/I2 = 75) | 93.9 | 93.9 | — | — | — | — | — | — | — | — |
| DOWLEX 2247G (LLDPE; I21/I2 = 29.9) | — | — | 93.9 | 88.9 | 83.9 | 73.9 | 63.9 | — | — | 63.9 |
| Polymer A (LLDPE; I21/I2 = 30) | — | — | — | — | — | — | — | 73.91 | — | — |
| DOWLEX GM 8480F (LLDPE; I21/I2 = 24.9) | — | — | — | — | — | — | — | — | 63.9 | — |
| DOWLEX 2036G (MDPE; I21/I2 = 27) | — | — | — | — | — | — | — | — | — | — |
| DOWLEX 2027G (MDPE; I21/I2 = 22.5) | — | — | — | — | — | — | — | — | — | — |
| DFH-3580H (MDPE; I21/I2 = 65) | — | — | — | — | — | — | — | — | — | — |
| VERSIFY 3000 (P/E; Mw/Mn = 2.4) | — | — | — | 5.0 | 10.0 | 20.0 | 30.0 | — | 30.0 | — |
| VERSIFY 2000 (P/E; Mw/Mn = 2.7) | — | — | — | — | — | — | — | — | — | — |
| Polymer B (P/E; Mw/Mn = 2.6) | — | — | — | — | — | — | — | 20.0 | — | — |
| PRO-FAX PD702 (PP; Mw/Mn = 3.2) | — | — | — | — | — | — | — | — | — | 30.0 |
| PRO-FAX RP448S (P/E; Mw/Mn = 3.9) | — | — | — | — | — | — | — | — | — | — |
| NAUGARD Super Q | 0.2 | 0.2 | 0.2 | 0.2 | 0.2 | 0.2 | 0.2 | 0.2 | 0.2 | 0.2 |
| IRGANOX 1035 | 0.07 | 0.07 | 0.07 | 0.07 | 0.07 | 0.07 | 0.07 | 0.07 | 0.07 | 0.07 |
| DYNAMAR FX 5912 | 0.02 | 0.02 | 0.02 | 0.02 | 0.02 | 0.02 | 0.02 | 0.02 | 0.02 | 0.02 |
| DFNA-0037BK | 5.8 | 5.8 | 5.8 | 5.8 | 5.8 | 5.8 | 5.8 | 5.8 | 5.8 | 5.8 |
| Density (g/cm$^3$) | 0.935 | 0.934 | 0.929 | 0.929 | 0.925 | 0.925 | 0.924 | 0.933 | 0.922 | 0.924 |
| I2 (dg/min) | 0.68 | 0.77 | 2.37 | 2.44 | 2.41 | 2.5 | 2.52 | 2.22 | 2.20 | 3.61 |
| Surface Roughness (μ-inch) (wire extrusion at 1.52 m/s) | 64.7 | 34 | 197.4 | 174.6 | 66.4 | 48.1 | 35.3 | 53 | 34.3 | 45 |
| Qualitative Smoothness | + | ++ | − | − | + | ++ | ++ | ++ | ++ | ++ |
| TS (MPa) | 15.62 | 15.1 | 20.92 | 23.94 | 23.66 | 18.84 | 17.03 | 14.4 | 22.9 | 13.9 |
| Aged TS (100° C./10 days) (MPa) | 14.17 | 12.9 | 22.13 | 22.67 | 20.58 | 20.58 | 14.67 | 13.73 | 13.73 | 13.5 |
| TS Retention (%) | 90.69 | 84.9 | 105.8 | 94.70 | 86.98 | 109.21 | 86.16 | 95.5 | 59.9 | 96.8 |
| TE (%) | 688 | 697 | 785 | 860 | 869 | 668 | 636 | 627 | 669 | 207 |
| Aged TE (100° C./10 days) (%) | 801 | 785 | 393 | 848 | 752 | 705 | 498 | 395 | 638 | 42 |
| TE Retention (%) | 116.42 | 113 | 50.10 | 98.60 | 86.54 | 105.54 | 78.30 | 63 | 95.3 | 20.3 |
| Pressure head (psi) | 2850 | 1400 | 2540 | 2750 | 2750 | 2450 | 2200 | 1018 | 2500 | 2100 |
| Melt temperature (° C.) | 224 | 224 | 214 | 224 | 224 | 224 | 224 | 218 | 221 | 221 |
| RSI (190° C., 0.25% strain, 25 mm plates) | 24.9 | 24.9 | 4.44 | NM | NM | NM | 9.43 | 22.5 | 14.83 | 7.80 |

TABLE 2-continued

| nRSI | 20.5 | 20.5 | 5.24 | NM | NM | NM | 12.51 | 33.5 | 21.99 | 14.82 |
|---|---|---|---|---|---|---|---|---|---|---|
| | CS 11 | CS 12 | Ex 13 | Ex 14 | CS 15 | CS 16 | Ex 17 | Ex 18 | CS 19 | CS 20 |
| DFH-2065 (LLDPE; I21/I2 = 75) | — | — | — | — | — | — | — | — | — | — |
| DOWLEX 2247G (LLDPE; I21/I2 = 29.9) | 63.9 | — | — | — | — | — | — | — | — | — |
| Polymer A (LLDPE; I21/I2 = 30) | — | — | — | — | — | — | — | — | — | — |
| DOWLEX GM 8480F (LLDPE; I21/I2 = 24.9) | — | — | — | — | — | — | — | — | — | — |
| DOWLEX 2036G (MDPE; I21/I2 = 27) | — | 93.9 | 83.9 | 73.9 | — | 84.0 | — | — | 94.11 | — |
| DOWLEX 2027G (MDPE; I21/I2 = 22.5) | — | — | — | — | — | — | 79.0 | 74.11 | — | 94.11 |
| DFH-3580H (MDPE; I21/I2 = 65) | — | — | — | — | 94.11 | — | — | — | — | — |
| VERSIFY 3000 (P/E; Mw/Mn = 2.4) | — | — | 10 | 20.0 | — | — | — | — | — | — |
| VERSIFY 2000 (P/E; Mw/Mn = 2.7) | — | — | — | — | — | 10.0 | 15.0 | 20.0 | — | — |
| Polymer B (P/E; Mw/Mn = 2.6) | — | — | — | — | — | — | — | — | — | — |
| PRO-FAX PD702 (PP; Mw/Mn = 3.2) | — | — | — | — | — | — | — | — | — | — |
| PRO-FAX RP448S (P/E; Mw/Mn = 3.9) | 30.0 | — | — | — | — | — | — | — | — | — |
| NAUGARD Super Q | 0.2 | 0.2 | 0.2 | 0.2 | 0.2 | 0.2 | 0.2 | 0.2 | 0.2 | 0.2 |
| IRGANOX 1035 | 0.07 | 0.07 | 0.07 | 0.07 | — | — | — | — | — | — |
| DYNAMAR FX 5912 | 0.02 | 0.02 | 0.02 | 0.02 | 0.02 | 0.02 | 0.02 | 0.02 | 0.02 | 0.02 |
| DFNA-0037BK | 5.8 | 5.8 | 5.8 | 5.8 | 5.67 | 5.67 | 5.67 | 5.67 | 5.67 | 5.67 |
| Density (g/cm$^3$) | 0.924 | 0.947 | 0.944 | 0.973 | 0.943 | 0.949 | 0.946 | 0.939 | 0.947 | 0.952 |
| I2 (dg/min) | 4.21 | 2.51 | 2.56 | 2.56 | 0.73 | 2.4 | 3.25 | 3.2 | 2.51 | 3.91 |
| Surface Roughness (μ-inch) (wire extrusion at 1.52 m/s) | 35.5 | 479.7 | 88.2 | 82.7 | 18.9 | 249 | 100 | 86 | 480 | 137 |
| Qualitative Smoothness | ++ | − | + | + | ++ | − | + | + | − | − |
| TS (MPa) | 13.9 | 21.12 | 21.26 | 21.68 | 25.35 | 21.53 | 23.55 | 23.43 | 21.13 | 25.40 |
| Aged TS (100° C./10 days) (MPa) | 13.2 | 22.63 | 22.55 | 22.68 | 24.68 | 23.28 | 24.57 | 25.06 | 22.64 | 25.48 |
| TS Retention (%) | 95.1 | 107.10 | 106.09 | 104.61 | 97.3 | 108.2 | 104.4 | 107.0 | 107.1 | 100.3 |
| TE (%) | 134 | 774 | 606 | 293 | 899 | 664 | 177 | 136 | 774 | 135 |
| Aged TE (100° C./10 days) (%) | 32 | 432 | 439 | 216 | 927 | 569 | 87 | 42 | 432 | 89 |
| TE Retention (%) | 23.9 | 55.8 | 72.44 | 73.72 | 103.1 | 85.7 | 49.2 | 30.9 | 55.8 | 65.9 |
| Pressure head (psi) | 1850 | 2650 | 3000 | 2650 | 2450 | 3200 | 2750 | 2350 | 2650 | 2530 |
| Melt temperature (° C.) | 221 | 214 | 224 | 224 | 214 | 224 | 224 | 214 | 214 | 214 |
| RSI (190° C., 0.25% strain, 25 mm plates) | 6.50 | 2.5 | 13.0 | 10.5 | 19.8 | 2.8 | 8.9 | 9.4 | 2.5 | 7.7 |
| nRSI | 13.34 | 4.0 | 20.8 | 16.8 | 16.9 | 4.3 | 16 | 16.8 | 4.0 | 15.3 |

CS = comparative sample
NM = not measured

The present disclosure advantageously expands the scope of base resins suitable to form conductor coating having a surface roughness from 20-100 μ-inch.

It is known that ethylene-based polymers with an I21/I2 ratio greater than 50 exhibit excellent processability, i.e., such polyethylene can be extruded at high line speeds with excellent surface roughness (CS 1 and CS 2). In contrast, ethylene-based polymers with an I21/I2 ratio less than 50 exhibit a viscosity profile that, comparatively, lacks both melt strength and shear thinning behavior (CS 3, CS 12). For instance, Table 2 shows that a comparative coating (CS 3) containing (A) an LLDPE having an I21/I2 ratio of 20-50 (DOWLEX 2247G, I21/I2 of 31) but lacking a (B) propylene/ethylene copolymer having a Mw/Mn of 2.0-3.5 exhibits an unacceptably high surface roughness of 197.4 μ-inch. Additionally, Table 2 shows that a comparative coating (CS 12) containing (A) an MDPE having an I21/I2 ratio of 20-50 (DOWLEX 2036G, I21/I2 of 27) but lacking a (B) propylene/ethylene copolymer having a Mw/Mn of 2.0-3.5 exhibits an unacceptably high surface roughness of 479.7 μ-inch. Therefore, ethylene-based polymers with an I21/I2 ratio less than 50 are limited on extrusion performance and generally result in conductor jacket with poor surface roughness (i.e., surface roughness greater than 100 μ-inch).

Applicant unexpectedly found that a coating containing the combination of (A) an ethylene-based polymer having an I21/I2 ratio of 20-50 and (B) a propylene/ethylene copolymer having a Mw/Mn of 2.0-3.5 advantageously achieves a surface roughness of 20-100μ-inch, which is comparable to coatings containing an ethylene-based polymer having an I21/I2 ratio greater than 50 (e.g., a GP resin) and no propylene/ethylene copolymer (CS 1, CS 2, and CS 15).

Applicant unexpectedly found that a coating containing the combination of (A) an ethylene-based polymer having an I21/I2 ratio of 20-50 and (B) a propylene/ethylene copolymer having a Mw/Mn of 2.0-3.5 advantageously achieves a surface roughness of 20-100μ-inch, which is comparable to a coating containing (A) an ethylene-based polymer having an I21/I2 ratio of 20-50; and (B)(i) a propylene/ethylene copolymer having a Mw/Mn greater than 3.5 (CS 11) or (B)(ii) a propylene homopolymer having a Mw/Mn of 2.0-3.5 but lacking ethylene comonomer (CS 10).

Applicant unexpectedly found that a coating containing the combination of (A) an ethylene-based polymer having an I21/I2 ratio of 20-50 and (B) a propylene/ethylene copolymer having a Mw/Mn of 2.0-3.5 advantageously achieves a surface roughness of 20-100μ-inch, while maintaining suitable coating I2 and tensile properties for coated conductor applications.

Specifically, Applicant unexpectedly found that the addition of a (B) propylene/ethylene copolymer having a Mw/Mn of 2.0-3.5 to the (A) LLDPE having an I21/I2 ratio of 20-50 (DOWLEX 2247G, I21/I2 of 31) advantageously reduces the surface roughness of the coating to 20-100 μ-inch, while maintaining suitable coating I2 and tensile properties for coated conductor applications. FIG. 1 is a graph showing the impact of the amount of propylene/ethylene copolymer (VERSIFY 3000) in a coating containing LLDPE (DOWLEX 2247G) on the surface roughness of the coating.

Figure 2:
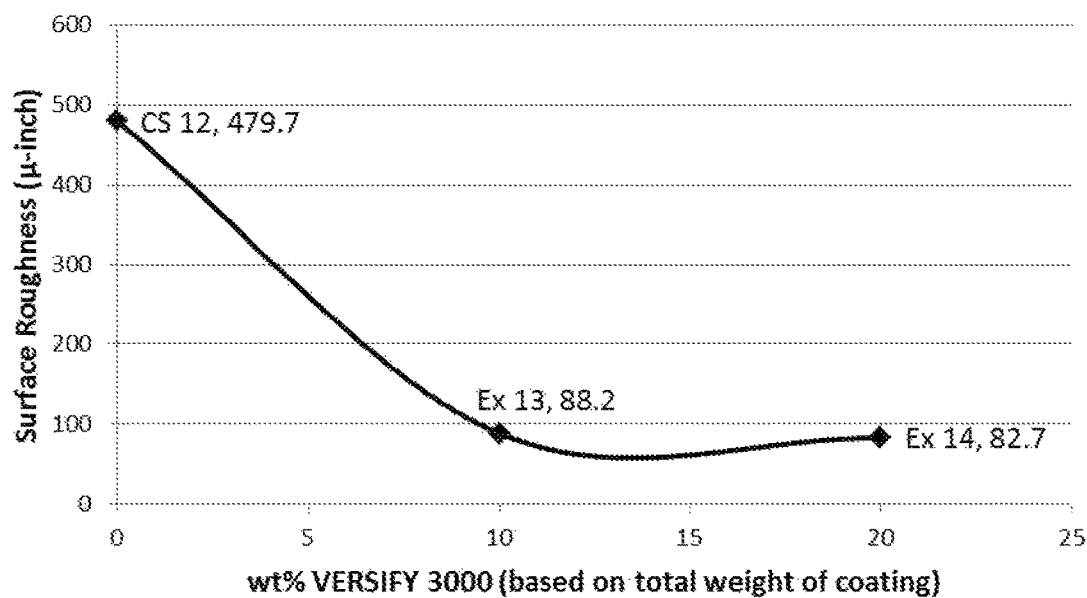
FIG. 2 is a graph showing the impact on surface roughness of the amount of propylene/ethylene copolymer in coating samples containing MDPE.

Furthermore, Applicant unexpectedly found that the addition of a (B) propylene/ethylene copolymer having a Mw/Mn of 2.0-3.5 to the (A) MDPE having an I21/I2 ratio of 20-50 (DOWLEX 2036G, I21/I2 of 27) advantageously reduces the surface roughness of the coating to 20-100 μ-inch, while maintaining suitable coating I2 and tensile properties for coated conductor applications. FIG. 2 is a graph showing the impact of the amount of propylene/ethylene copolymer (VERSIFY 3000) in a coating containing MDPE (DOWLEX 2036G) on the surface roughness of the coating.

The improved surface roughness upon addition of (B) propylene/ethylene copolymer having a Mw/Mn of 2.0-3.5 is unexpected, i.e., the surface roughness in not a linear function of the content of the (B) propylene/ethylene copolymer having a Mw/Mn of 2.0-3.5, as shown by the data of Table 2, and by FIGS. 1 and 2. Furthermore, the inventive composition, overall, show improved mechanical properties over the range of the proposed coating compositions.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:
1. A coated conductor comprising:
a conductor;
an outermost coating on the conductor, the coating comprising:
 (A) from 60 wt % to 90 wt % of an ethylene-based polymer consisting of (i) ethylene and (ii) a $C_4$-$C_8$ α-olefin comonomer and having an I21/I2 ratio from 20 to 50;
 (B) from 10 wt % to 30 wt % of a propylene/ethylene copolymer consisting of (i) propylene and (ii) from 1 wt% to 15 wt% units derived from ethylene, based on the total weight of the propylene/ethylene copolymer and having a Mw/Mn from 2.0 to 3.5; and
 (C) optionally, from greater than 0 wt % to 15 wt % of an additive, and
the coating having
a surface roughness from 20 μ-inch to 100 μ-inch, and an I2 from 2.0 g/10 min to 3.5 g/10 min.
2. The coated conductor of claim 1, wherein the (A) ethylene-based polymer is an ethylene/α-olefin copolymer.

3. The coated conductor of claim 1, wherein the (A) ethylene-based polymer is selected from the group consisting of linear low density polyethylene (LLDPE), medium density polyethylene (MDPE), high density polyethylene (HDPE), and combinations thereof.
4. The coated conductor of claim 1, wherein the (B) propylene/ethylene copolymer has a melting temperature, Tm, from 25° C. to 120° C.
5. The coated conductor of claim 1, wherein the (B) propylene/ethylene copolymer has a density from 0.880 g/cc to 0.905 g/cc.
6. The coated conductor of claim 1, wherein the (B) propylene/ethylene copolymer has a Normalized Relaxation Spectrum Index (nRSI) from 15 to 35.
7. The coated conductor of claim 1 comprising the additive, wherein the additive is selected from the group consisting of carbon black, antioxidant, stabilizer, processing aid, and combinations thereof.
8. The coated conductor of claim 1, wherein the coating comprises:
 (A) from 60 wt % to 90 wt % of the ethylene-based polymer that is an MDPE;
 (B) from 10 wt % to 30 wt % of the propylene/ethylene copolymer;
 (C) optionally, from greater than 0 wt % to 15 wt % of an additive; and
the coating having a surface roughness from 30 μ-inch to 100 μ-inch, and an I2 from 2.0 g/10 min to 3.5 g/10 min.
9. The coated conductor of claim 1, wherein the coating comprises:
 (A) from 60 wt % to 90 wt % of the ethylene-based polymer that is a LLDPE;
 (B) from 10 wt % to 30 wt % of the propylene/ethylene copolymer;
 (C) optionally, from greater than 0 wt% to 15 wt% of an additive; and
the coating having a surface roughness from 30 μ-inch to 80 μ-inch, and an I2 from 2.0 g/10 min to 3.5 g/10 min.
10. The coated conductor of claim 1, wherein the coating consists of:
 (A) the ethylene-based polymer;
 (B) the propylene/ethylene copolymer; and
 (C) optionally, an additive selected from the group consisting of carbon black, antioxidants, colorants, ultra violet (UV) absorbers or stabilizers, anti-blocking agents, flame retardants, compatibilizers, plasticizers, fillers, processing aids, and combinations thereof.
11. The coated conductor of claim 1, wherein the coating is in direct contact with the conductor.
12. The coated conductor of any of claim 1, wherein an insulation layer is in direct contact with the conductor, and the coating is in direct contact with the insulation layer.
13. The coated conductor of claim 1 comprising from 1 wt % to 10 wt % of the additive selected from the group consisting of carbon black, antioxidant, stabilizer, processing aid, and combinations thereof.
14. The coated conductor of claim 13 comprising carbon black.
15. The coated conductor of claim 8 comprising from 1 wt % to 10 wt % of the additive selected from the group consisting of carbon black, antioxidant, stabilizer, processing aid, and combinations thereof.
16. The coated conductor of claim 15 comprising carbon black.
17. The coated conductor of claim 9 comprising from 1 wt % to 10 wt % of the additive selected from the group consisting of carbon black, antioxidant, stabilizer, processing aid, and combinations thereof.

18. The coated conductor of claim 17 comprising carbon black.

19. The coated conductor of claim 10 with from 1 wt % to 10 wt % of the additive selected from the group consisting of carbon black, antioxidant, stabilizer, processing aid, and combinations thereof.

20. The coated conductor of claim 19 with carbon black.

* * * * *